United States Patent Office 3,472,767
Patented Oct. 14, 1969

3,472,767
WASTE TREATMENT
Ronald D. Lees, Wilmington, Del., assignor to Hercules Incorporated, Wilmington, Del., a corporation of Delaware
No Drawing. Filed Jan. 31, 1968, Ser. No. 701,847
Int. Cl. C02c 1/40, 1/06
U.S. Cl. 210—52                                    4 Claims

ABSTRACT OF THE DISCLOSURE

A process is provided for facilitating the dewatering of waste having suspended solids by contacting the waste with a cationic polyelectrolyte polymer in the presence of an acid salt containing polyvalent metal ions.

The present invention relates to the treatment of waste, and more particularly to a process of treating sewage. In one embodiment it relates to a process of dewatering sewage, especially sewage sludge containing one or more unctuous materials.

The term "unctuous" is used herein in its usual sense to mean greasy, oily, fatty, and the like.

Thus while the present invention is applicable broadly to dewatering waste in general including e.g. industrial, municipal and domestic waste, the benefits of the present invention are far more fully realized when applied to dewatering unctuous waste. For the sake of simplicity and ease of understanding the present invention will be described for the most part herein with regard to dewatering by vacuum filtration aqueous unctuous sewage slurry. A typical source of such waste is rendering plants.

The disposal of solids after sewage treatment has always been a problem. At one time some plants simply discarded sewage sludge into nearby streams. Then, as pollution increased, many plants began to barge the sewage to sea or to lagoon it in large evacuated areas. Finally most plants turned to vacuum filtration as a satisfactory means of separating sewage solids from slurries and either incinerating these solids or using them in land fill or as fertilizer, and this concentration or substantially dewatering of the sewage solids is necessary before they can be effectively used or discarded in the manner indicated.

In a typical sewage treatment plant the steps involved often include, in the order given, (1) primary sedimentation (usually after coarsely screening the raw sewage slurry through grit separators), (2) aeration, (3) digestion, (4) elutriation, (5) vacuum filtration, and (6) incineration or other disposal or end use of the sewage solids. However, vacuum filtration or other means of dewatering may be employed at one or more of a number of places in a sewage treatment plant, e.g. after one or more of steps 1–4, and the present invention is applicable to dewatering of sewage or other waste irrespective of where it is carried out in the waste treatment process.

The typical vacuum filter employed for sewage treatment includes a large rotary drum covered with open-mesh metal or fiber filter cloth. As the drum is rotated through the sewage slurry contained in a filter pan below the drum, vacuum is applied by suction toward the center of the drum through the filter cloth. In this manner the sewage solids are continuously "picked up" on the filter and removed therefrom as "dry sludge cake" by any of several means such as air pressure or scrapers, thus dewatering the sewage slurry.

However, unless a suitable flocculant (coagulant) is added to the sewage slurry, the sewage solids remain in the form of small hydrated particles and cannot be vacuum filtered or otherwise satisfactorily dewatered. The flocculant causes the small particles of sewage solids to cling together and form larger flocs which more readily release their bound water when dewatered by vacuum filtration or other means. Heretofore inorganic materials as well as synthetic organic polyelectrolyte polymers have been employed as flocculants. However dewatering processes employing these flocculants leaves much to be desired where the sewage or other waste contains one or more unctuous materials even in fairly small quantities. One difficulty of major concern is that due in large part to the unctuous nature of the sewage being treated the sewage clogs or "blinds" the openings of the filter medium and thereby drastically reduces or stops the pick up of sewage solids by the filters. As a result of this the filtering operation must be discontinued to clean or even to replace the filters. The seriousness of this problem is evidenced by the fact that it requires the plant to be shut down approximately 50% of operating time.

It has been found according to the present invention that dewatering of waste having solids suspended therein is greatly facilitated by carrying out the process which comprises contacting the waste with a synthetic cationic polyelectrolyte polymer and an acid salt containing polyvalent metal ions. Removal of water may then be accomplished by any of several conventional means including e.g. filtration. Especially applicable is unctuous waste including e.g. sewage slurry containing the effluent from rendering plants. Particularly good results have been obtained according to the present invention employing acid salts containing trivalent metal ions together with said polymers in treating unctuous sewage slurry.

The effectiveness of the process of the present invention has been demonstrated both in the laboratory and in sewage treatment plants employing actual operating conditions.

The following examples illustrate various embodiments of the present invention, however these examples are not intended to limit the present invention beyond the scope of the appended claims. In these examples and elsewhere herein parts and percent are by weight unless otherwise indicated.

EXAMPLES 1 AND 2.—SEWAGE PLANT RUNS

Runs were carried out to determine the effect on the filtration characteristics of unctuous sewage slurry of polymer alone (prior art) as contrasted with the same polymer together with acid salt containing polyvalent metal ions (present invention) as dewatering aid.

The dewatering aid (Table 1 hereinafter) was added to the plant was not employing an elutriation step.
with sewage sludge after the digestion step (identified hereinbefore) and pumping the resulting mixture directly into the filter pan of the rotary vacuum filter employed in the vacuum filtration step (identified hereinbefore), i.e. the plant was not employing an elutriation step.

Further details appear in Table 1 hereinafter. As will be seen from this table, the present invention increased by more than 40% efficiency of a sewage treatment plant, efficiency being reported as customary in dry solids yields in a given operating period.

TABLE 1.—SEWAGE PLANT RUNS

| | Dewatering Aid | | Percent solids in influent sewage sludge | Dry solids yields, lbs./hr. | Time, hrs. |
| Name | Amount [1] | | | | |
| | Polymer | Salt | | | |
|---|---|---|---|---|---|
| Example No.: | | | | | |
| 1 ........ Polymer A only ........ | 131 | None | 14 | 1,960 | 19.0 [2] |
| 2 ........ Polymer A plus Salt A ... | 64 | 6,000 | 14 | 2,920 | 20.5 [3] |

[1] P.p.m. dry weight basis by weight of total dry solids in sewage treated. Polymer added as 0.1% aqueous solution and salt added as 1.0% aqueous solution.
[2] Had to be shut down 42% of this time for unclogging the filter.
[3] No shut down was necessary—gave continuous good filtration.
Polymer A=83% acrylamide, 17% MTMMS copolymer.
Salt A=AlCl$_3$.
MTMMS=Beta methacryloyloxyethyltrimethylammonium methyl sulfate.

EXAMPLES 3–55.—SEWAGE TREATMENT LABORATORY RUNS

These runs were carried out for the same purpose and on substantially the same unctuous sewage as in Examples 1 and 2 above.

250 ml. positions of the sewage sludge were placed in each of several clean 500 ml. graduated cylinders. Dewatering aid was added to the sewage slurry and mixed therewith by inverting the graduated cylinders end-over-end eight times. Then the sewage slurry was filtered by pouring into Buchner funnels lined with No. 4 Whatman filter paper. A 25-inch mercury vacuum was applied to the funnels and the filtrates collected in 250 ml. graduated cylinders.

Further details appear in Tables 2–7 hereinafter.

TABLE 2.—SEWAGE TREATMENT LABORATORY RUNS

| Example No. | Dewatering Aid | | | | Ml. filtrate after 5 mins. |
| | Polymer | | Salt | | |
| | Name [1] | Amount [2] | Name | Amount [2] | |
|---|---|---|---|---|---|
| 3 | None | None | None | None | 23 |
| 4 | do | None | AlCl$_3$ | 5,000 | 29 |
| 5 | 83% acrylamide, 17% MTMMS | 2,000 | None | None | 83 |
| 6 | do | 2,000 | AlCl$_3$ | 5,000 | 149 |
| 7 | do | 2,000 | AlCl$_3$ | 500 | 146 |
| 8 | None | None | None | None | 23 |
| 9 | do | None | AlCl$_3$ | 50,000 | 30 |
| 10 | 83% acrylamide, 17% MTMMS | 500 | None | None | 29 |
| 11 | do | 500 | AlCl$_3$ | 50,000 | 89 |
| 12 | None | None | None | None | 23 |
| 13 | do | None | AlCl$_3$ | 500 | 28 |
| 14 | 83% acrylamide, 17% MTMMS | 500 | None | None | 29 |
| 15 | do | 500 | AlCl$_3$ | 500 | 44 |

[1] MTMMS=Beta methacryloyloxyethyltrimethylammonium methyl sulfate.
[2] P.p.m. dry weight basis by weight of total dry solids in sewage treated. Polymer added as 0.1% aqueous solution and salt added as 1.0% aqueous solution.

TABLE 3.—SEWAGE TREATMENT LABORATORY RUNS

| | Dewatering Aid | | | | Ml. filtrate after 5 mins. |
| | Polymer | | Salt | | |
| | Name [1] | Amount [2] | Name | Amount [2] | |
|---|---|---|---|---|---|
| Example No. | | | | | |
| 16 | None | None | None | None | 23 |
| 17 | do | None | Al$_2$(SO$_4$)$_3$ | 500 | 23 |
| 18 | 94% acrylamide, 6% MTMMS | 2,000 | None | None | 70 |
| 19 | do | 2,000 | Al$_2$(SO$_4$)$_3$ | 500 | 96 |
| 20 | None | None | None | None | 23 |
| 21 | do | None | Al$_2$(SO$_4$)$_3$ | 50,000 | 23 |
| 22 | 94% acrylamide, 6% MTMMS | 500 | None | None | 27 |
| 23 | do | 500 | Al$_2$(SO$_4$)$_3$ | 50,000 | 46 |
| 24 | None | None | None | None | 23 |
| 25 | do | None | Al$_2$(SO$_4$)$_3$ | 500 | 23 |
| 26 | 94% acrylamide, 6% MTMMS | 500 | None | None | 27 |
| 27 | do | 500 | Al$_2$(SO$_4$)$_3$ | 500 | 34 |

[1] MTMMS=beta methacryloyloxyethyltrimethylammonium methyl sulfate.
[2] P.p.m. dry weight basis by weight of total dry solids in sewage treated. Polymer added as 0.1% aqueous solution and salt added as 1.0% aqueous solution.

TABLE 4.—SEWAGE TREATMENT LABORATORY RUNS

| | Dewatering Aid | | | | Ml. filtrate after 5 mins. |
| | Polymer | | Salt | | |
| | Name [1] | Amount [2] | Name | Amount [2] | |
|---|---|---|---|---|---|
| Example No.: | | | | | |
| 28 | None | None | None | None | 23 |
| 29 | do | None | FeCl$_3$ | 50,000 | 26 |
| 30 | Polymer B | 2,000 | None | None | 29 |
| 31 | do | 2,000 | FeCl$_3$ | 50,000 | 65 |
| 32 | None | None | None | None | 23 |
| 33 | do | None | FeCl$_3$ | 50,000 | 26 |
| 34 | Polymer B | 500 | None | None | 27 |
| 35 | do | 500 | FeCl$_3$ | 50,000 | 43 |

[1] Polymer B=1,2-dimethyl-5-vinyl pyridinium methyl sulfate.
[2] P.p.m. dry weight basis by weight of total dry solids in sewage treated. Polymer added as 0.1% aqueous solution and salt added as 1.0% aqueous solution.

TABLE 5.—SEWAGE TREATMENT LABORATORY RUNS

| Ex. No. | Polymer Name | Polymer Amount[1] | Salt Name | Salt Amount[1] | Ml. filtrate after 5 mins. |
|---|---|---|---|---|---|
| 36 | None | None | None | None | 23 |
| 37 | do | None | FeCl$_3$ | 50,000 | 26 |
| 38 | Polyethylenimine | 2,000 | None | None | 24 |
| 39 | do | 2,000 | FeCl$_3$ | 50,000 | 53 |
| 40 | None | None | None | None | 23 |
| 41 | do | None | FeCl$_3$ | 50,000 | 26 |
| 42 | Polyethylenimine | 500 | None | None | 24 |
| 43 | do | 500 | FeCl$_3$ | 50,000 | 39 |

[1] P.p.m. dry weight basis by weight of total dry solids in sewage treated. Polymer added as 0.1% aqueous solution and salt added as 1.0% aqueous solution.

TABLE 6.—SEWAGE TREATMENT LABORATORY RUNS

| Ex. No. | Polymer Name[1] | Polymer Amount[2] | Salt Name | Salt Amount[2] | Ml. filtrate after 5 mins. |
|---|---|---|---|---|---|
| 44 | None | None | None | None | 23 |
| 45 | do | None | FeCl$_3$ | 500 | 25 |
| 46 | "Calgon ST–260"[1] | 2,000 | None | None | 27 |
| 47 | "Calgon ST–260" | 2,000 | FeCl$_3$ | 500 | 63 |
| 48 | None | None | None | None | 23 |
| 49 | do | None | FeCl$_3$ | 500 | 25 |
| 50 | "Calgon ST–260" | 500 | None | None | 26 |
| 51 | do | 500 | FeCl$_3$ | 500 | 37 |

[1] Available under this trade designation from Calgon Corporation.
[2] P.p.m. dry weight basis by weight of total dry solids in sewage treated. Polymer added as 0.1% aqueous solution and salt added as 1.0% aqueous solution.

TABLE 7.—SEWAGE TREATMENT LABORATORY RUNS

| Ex. No. | Polymer Name[1] | Polymer Amount[2] | Salt Name | Salt Amount[2] | Ml. filtrate after 5 mins. |
|---|---|---|---|---|---|
| 52 | None | None | None | None | 23 |
| 53 | do | None | FeClc | 5,000 | 24 |
| 54 | "Nalco D–2073" | 2,000 | None | None | 29 |
| 55 | "Nalco D–2073" | 2,000 | FeClc | 5,000 | 73 |

[1] Available under this trade designation from Nalco Chemical Company.
[2] P.p.m. dry weight basis by weight of total dry solids in sewage treated. Polymer added as 0.1% aqueous solution and salt added as 1.0% aqueous solution.

Polymers applicable herein are the synthetic organic water soluble cationic polyelectrolyte polymers. Preferred are such polymers of fairly high average molecular weight, for instance those having a minimum molecular weight of at least about 10,000. Polymers having a minimum molecular weight of at least about 100,000 are more specifically preferred. However polymers having an average molecular weight below 10,000 are operable. Mixtures of two or more of these polymers can also be used.

The polymers may be homopolymers or copolymers, and the term "polymers" as used herein is intended to mean both. They may be prepared directly by polymerization of monomers or by chemical treatment after polymerization. Preferred polymers include the copolymers of acrylamide monomers ("acrylamide" being used to designate acrylamide per se as well as acrylamide substituted on the alpha carbon atom as well as on the nitrogen atom) with other ethylenically unsaturated monomers such as for example (1) vinyl quaternary ammonium salts including those derived from dialkylaminoalkyl methacrylate (e.g., beta methacryloyloxyethyltrimethylammonium methyl sulfate), dialkylaminoalkyl acrylate, dialkylaminoalkyl vinyl ether, (2) vinyl pyridinium salts including those derived from 2-vinyl pyridine, 4-vinyl pyridine, 2-methyl 5-vinyl pyridine (e.g., 1,2-dimethyl-5-vinyl pyridinium methyl sulfate), 2-vinyl 5-ethyl pyridine.

Salts applicable herein, in combination with the polyelectrolytes, as dewatering aids comprise substantially water soluble inorganic acid salts containing polyvalent metal ions and preferably trivalent metal ions such as e.g., Al$^{+++}$ or Fe$^{+++}$ or both. Particularly good results have been obtained with for instance AlCl$_3$, FeCl$_3$ and Al$_2$(SO$_4$)$_3$. Mixtures of two or more such salts may also be used.

From the foregoing examples it will be readily apparent that the amounts of polyelectrolyte polymer and acid salts containing polyvalent metal ions may vary widely depending on a number of factors including e.g., the particular polyelectrolyte and salt. These amounts will also vary with the particular waste being treated. As will be seen even very small amounts of acid salts substantially increases the performance of the polyelectrolyte polymers. Expressed in p.p.m. dry weight basis by weight of the total dry solids in the waste treated, these may be about as follows: For the polyelectrolyte polymer 25–50,000, preferably 50–10,000. For the acid salt 250–75,000, preferably 500–50,000. With the acrylamide-beta methacryloyloxyethyltrimethylammonium methyl sulfate copolymers as the polyelectrolytes particularly good results are obtained with about 25–5000, preferably 50–2000 p.p.m. With the 1,2-dimethyl-5-vinyl pyridinium methyl sulfate polymer as the polyelectrolyte particularly good results are obtained with about 500–10,000, preferably 2,500–7,500 p.p.m. With AlCl$_3$, FeCl$_3$, and Al$_2$(SO$_4$)$_3$ as the acid salt particularly good results are obtained with about 500–50,000, preferably 2,500–25,000 p.p.m.

As many apparent and widely different embodiments of this invention may be made without departing from the spirit and scope thereof, it is to be understood that the invention is not limited to the specific embodiments thereof except as defined in the appended claims.

What I claim and desired to protect by Letters Patent is:

1. Process of facilitating the dewatering of waste having solids suspended therein which comprises contacting the waste with a copolymer of acrylamide and beta methacryloyloxyethyltrimethylammonium methyl sulfate in the presence of an acid salt containing polyvalent metal ions.

2. Process of claim 1 wherein said acid salt contains trivalent aluminum ions.

3. Process of claim 1 wherein said acid salt contains trivalent iron ions.

4. Process of facilitating the dewatering of waste having solids suspended therein which comprises contacting the waste with a homopolymer of beta methacryloyloxyethyltrimethylammonium methyl sulfate in the presence of an acid salt containing polyvalent metal ions.

References Cited
UNITED STATES PATENTS

| | | | |
|---|---|---|---|
| 2,955,932 | 10/1960 | Goren | 210—54 X |
| 3,014,896 | 12/1961 | Colwell et al. | 210—54 X |
| 3,130,167 | 4/1964 | Green | 210—54 X |
| 3,259,570 | 7/1966 | Priesing et al. | 210—10 X |

MICHAEL E. ROGERS, Primary Examiner

U.S. Cl. X.R.

210—10, 54

UNITED STATES PATENT OFFICE
CERTIFICATE OF CORRECTION

Patent No. 3,472,767　　　　　　　　　　　　　　October 14, 1969

Ronald D. Lees

It is certified that error appears in the above identified patent and that said Letters Patent are hereby corrected as shown below:

Column 2, line 56, after "the" insert -- sewage treatment --; same line 56, cancel "was not employing an elutriation step" and insert -- by mixing the dewatering aid --; line 64, after "40%" insert -- the --. Column 3, in Table 2, footnote (2), "agueous" should read -- aqueous --. Column 5, in Table 7, opposite Examples 53 and 55, "$FeCl_c$" should read -- $FeCl_3$ --; same column 5, in Table 7, opposite Example 54, footnote "(1)" should appear after "Nalco D-2073".

Signed and sealed this 19th day of May 1970.

(SEAL)
Attest:

Edward M. Fletcher, Jr.　　　　　　　　　　　WILLIAM E. SCHUYLER, JR.
Attesting Officer　　　　　　　　　　　　　　　Commissioner of Patents